Aug. 13, 1963   R. A. MOBLEY, JR   3,100,435
ROTISSERIE RACK HAVING MEANS FOR DISENGAGING THE DRIVE MOTOR
Filed March 8, 1961   3 Sheets-Sheet 1
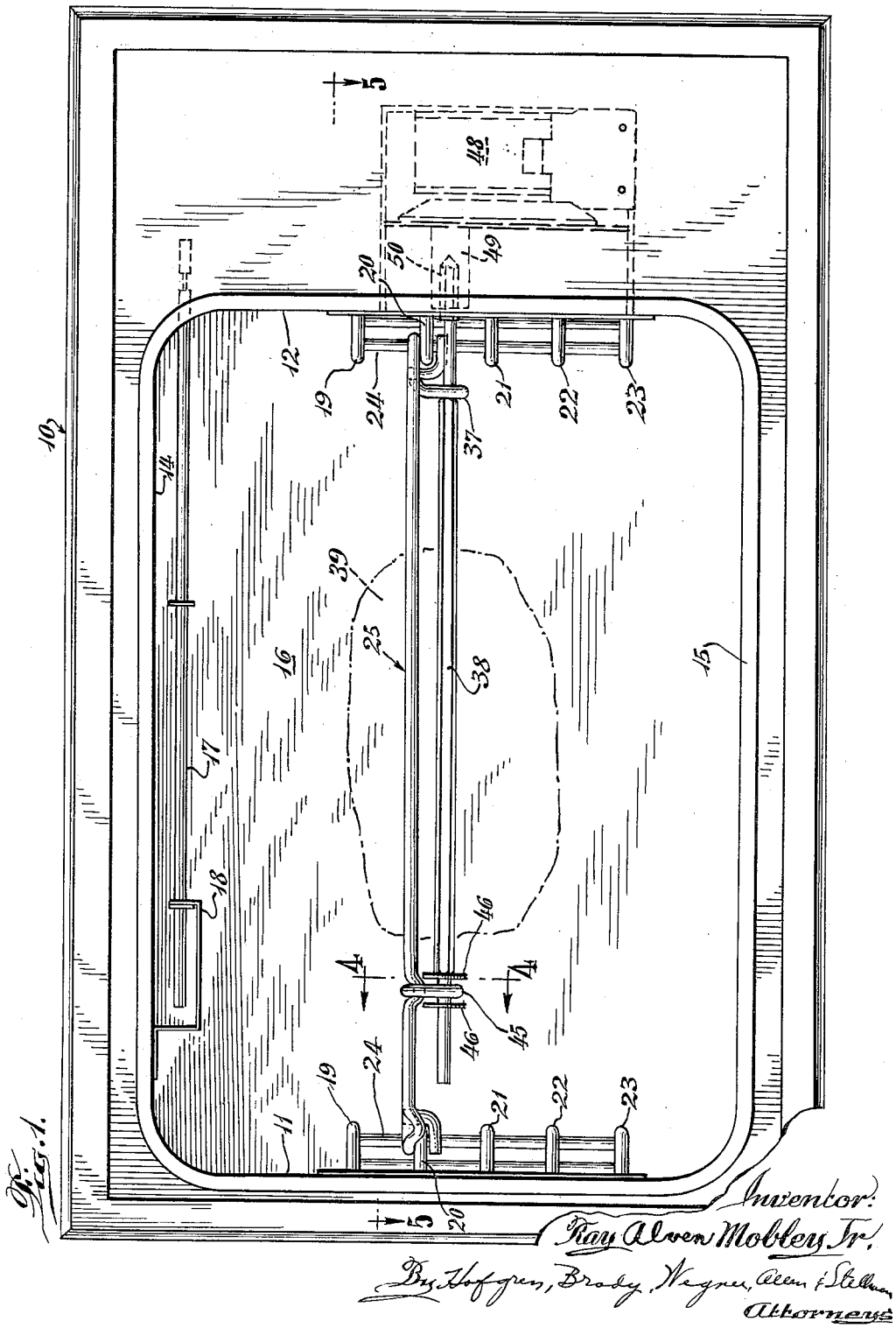

Aug. 13, 1963 R. A. MOBLEY, JR 3,100,435
ROTISSERIE RACK HAVING MEANS FOR DISENGAGING THE DRIVE MOTOR
Filed March 8, 1961 3 Sheets-Sheet 2
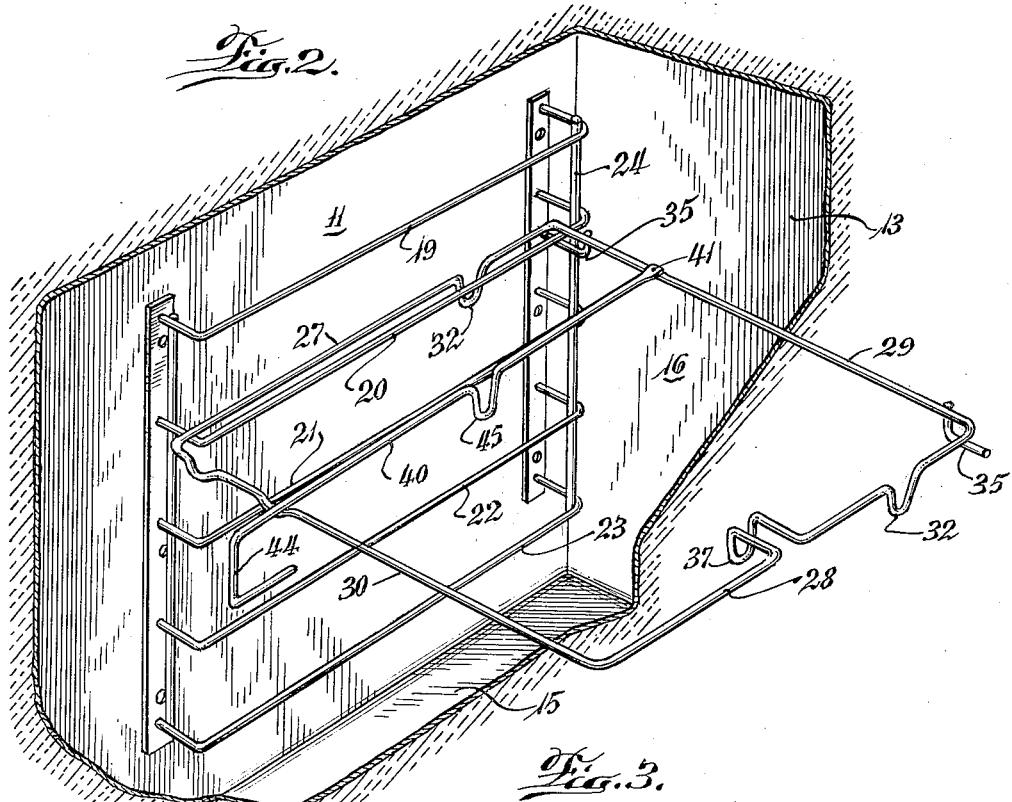
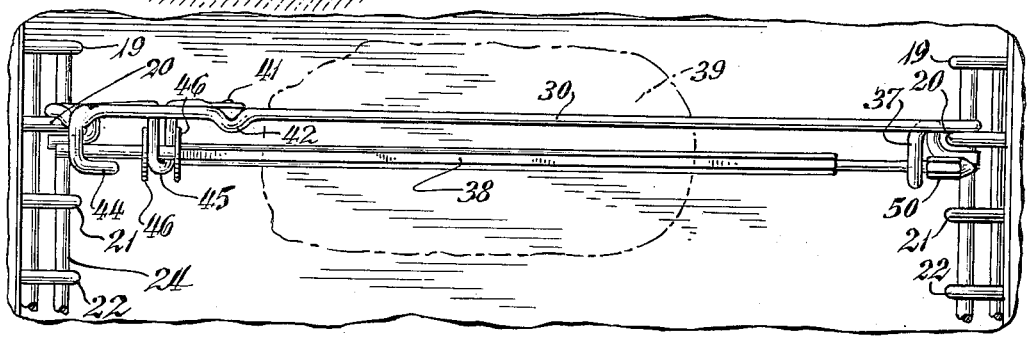
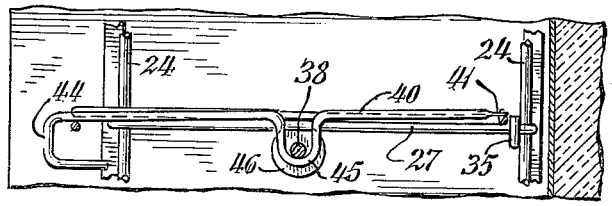

Aug. 13, 1963 R. A. MOBLEY, JR 3,100,435
ROTISSERIE RACK HAVING MEANS FOR DISENGAGING THE DRIVE MOTOR
Filed March 8, 1961 3 Sheets-Sheet 3

United States Patent Office 3,100,435
Patented Aug. 13, 1963

3,100,435
ROTISSERIE RACK HAVING MEANS FOR DISENGAGING THE DRIVE MOTOR
Ray Alven Mobley, Jr., Hamilton, Ohio, assignor to Whirlpool Corporation, a corporation of Delaware
Filed Mar. 8, 1961, Ser. No. 94,321
8 Claims. (Cl. 99—421)

This invention relates to food supporting apparatus for supporting food during a cooking operation.

The invention here relates especially to a food supporting apparatus such as a rotisserie for supporting food in a cooking unit such as the broiler of a kitchen stove. The food engaging member such as the broiler spit is rotatable and is normally rotated by a driving means during the cooking operation.

One of the features of this invention is to provide an improved food supporting apparatus such as a rotisserie which can be partially withdrawn from a cooking space such as a stove broiler for inserting the uncooked food or removing the cooked food so as to alleviate the danger of accidental injury to the operator and which when in position provides means for moving the rotatable food engaging member such as the rotisserie spit into driving engagement with a driving means.

Other advantages of the invention will be apparent from the following description of one embodiment thereof taken in conjunction with the accompanying drawings. Of the drawings:

FIGURE 1 is a fragmentary front elevational view of the broiling section of a cooking stove with certain portions omitted for clarity of illustration.

FIGURE 2 is a fragmentary perspective view of a portion of the interior of the broiling section of FIGURE 1.

FIGURE 3 is a fragmentary front elevational view showing the parts of the rotisserie in a different position from similar parts in FIGURE 1.

FIGURE 4 is a fragmentary sectional elevational view taken substantially along the line 4—4 of FIGURES 1 and 5.

Figure 5:
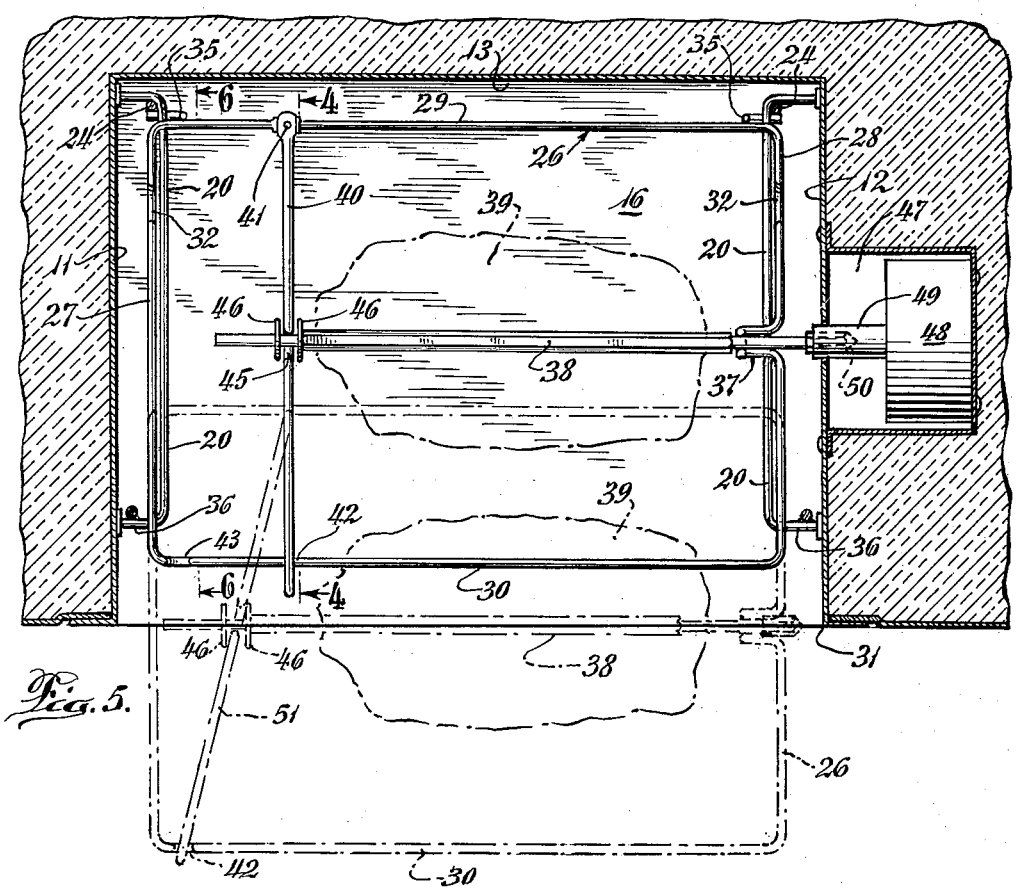
FIGURE 5 is a sectional elevational view taken substantially along the line 5—5 of FIGURE 1.
Figure 6:
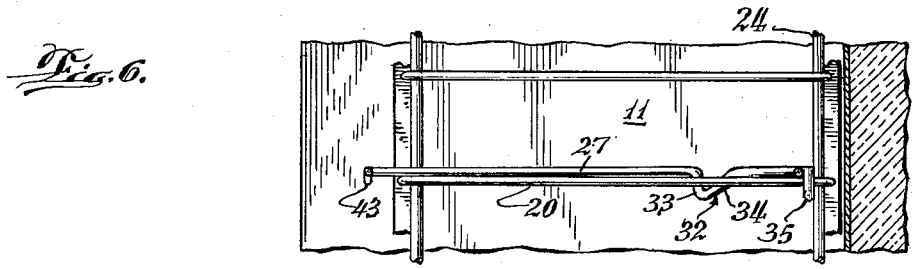
FIGURE 6 is a sectional elevational view taken substantially along the line 6—6 of FIGURE 5.

In the embodiment shown in the accompanying drawings, there is illustrated a cooking unit such as an electric range 10 having a pair of opposite side walls 11 and 12, a rear wall 13 and a top wall 14 and a bottom wall 15 defining a cooking space 16 which, as illustrated, is the interior of an oven which may be used as a broiler. The space 16 is heated by means of an electric broil unit 17 held adjacent the top wall 14 by a bracket 18.

Side wall 11 has attached thereto five vertically spaced horizontally extending wire supports 19, 20, 21, 22 and 23 which are adapted to cooperate with similar supports 19—23 on the opposite side wall 12 for supporting wire shelves (not shown) which in turn support food during the normal baking operation of the oven. Each set of side wire supports 19—23 is provided with a vertical wire 24 attached to the supports 19—23 adjacent the rear ends thereof and spaced from the side walls 11 and 12.

Adapted to be supported on the second from the top wire supports 20 is a rotisserie structure 25 embodying the invention. This rotisserie structure includes a wire frame 26 having side members 27 and 28 adjacent the side walls 11 and 12 respectively. The frame also includes a rear side member 29 normally adjacent the rear wall 13 and a front side member 30 normally adjacent and inwardly of an access opening 31 to the cooking space 16.

The rear and front side members 29 and 30 of the frame 26 have their ends extending beyond the wire supports 20 and with the frame side members 27 and 28 located inwardly of the wire supports 20 so that the frame 26 is retained in position on the wire supports 20. As can be seen, the side members 27—30 of the frame 26 are merely sides of a continuous wire frame 26 and each side member 27 and 28 of this frame is provided with a downwardly bent portion 32 having a relatively straight front 33 and a sloped back 34 with each bent portion 32 being located adjacent the rear of the frame. In addition, the opposite ends of the rear member 29 of the wire frame 26 have welded thereto downwardly and outwardly extending L-shaped stops 35 also made of wire. When the frame 26 is in position, these stops 35 are forwardly of the vertical wires 24 and in contact therewith so that the stops 35 striking the wires 24 serve to limit the extent of rearward movement of the frame 26 and to correctly align the spit 38 with socket 49 of the electric motor and gear box 48. The forward movement of the frame 26 is limited by the fronts 33 of the bent portion 32 striking the fronts 36 of the wire supports 20, as illustrated in FIGURE 7.

The side member 28 of the wire frame 26 is provided with a generally U-shaped portion 37 which extends inwardly and downwardly to provide a support for the right-hand end of the spit 38. This spit is octagonal in order to support food such as meat illustrated diagrammatically at 39.

The opposite end of the spit 38 is supported by a wire lever 40 that has one end riveted at 41 to the rear side member 29 of the wire frame 26 so as to be oscillatable in a generally horizontal plane. The forward end of this lever 40 extends across the top of the front frame side member 30 and is retained in two positions by means of depressions 42 and 43 in the forward side member 30. This forward end of the lever 40 is provided with a handle portion 44 (FIGURE 4). The lever is also provided with a downwardly bent U-shaped portion 45 that is laterally aligned with the portion 47 so as to hold rotatably the other end of the spit 38. This spit is provided with a pair of collars 46 attached thereto on opposite sides of the wire portion 45 so that lateral oscillation of the lever 40 will cause longitudinal movement of the spit 38 with the right-hand end of the spit as viewed in FIGURE 1 sliding in the U-shaped portion or loop 37. Located in a cavity 47 in the side wall 12 is an electric motor and gear box 48 having a socket 49 for receiving the driving end 50 of the spit 38.

Figure 7:
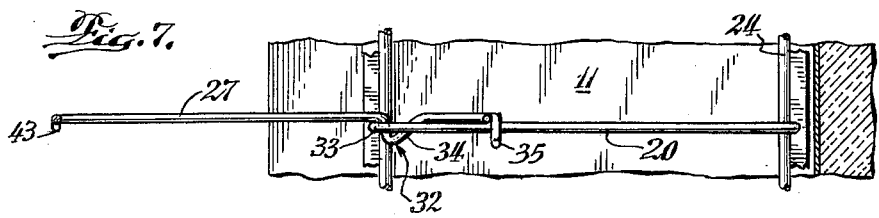
FIGURE 7 is a view similar to FIGURE 6 but showing the apparatus partially withdrawn from the cooking space.

When the rotisserie structure 25 is in its normal operating position within the cooking space 16, as illustrated in all figures of the drawings except FIGURES 3, 4, and 7, the stops 35 are against the rear vertical wires 24 and the lever 40 is in engagement with the first depression 42 so that the driving end 50 of the spit 38 is in driving engagement with the socket 49. The spit 38 is then slowly rotated in the normal manner to cook the food such as the meat 39. Then, at the conclusion of the cooking operation, the lever 40 is lifted and moved to the left, as illustrated by the broken line position 51 of the lever, until the lever is in engagement with the depression 43. This moves the spit 38 longitudinally to remove the driving end 50 of the spit from the driving socket 49.

Thereupon, the housewife, or other operator, of the broiler can pull the frame 26 forwardly to the broken line position of FIGURE 5 where the bent portions or stops 32 in the side wires 27 and 28 engage the front 26 of supports 20. As is shown by the broken line position of FIGURE 5, the spit 38 with food thereon may thereupon be easily lifted from the frame 26, as in this position the spit is substantially within the access opening 31 to the cooking space 16. The frame 26 will not be accidentally dislodged from the side supports, even in this position, as the two wires of the rear stops 35 extend beneath the side supports 20, as is illustrated most clearly in FIGURE 2.

When the oven is to be used for the normal baking operation, the frame 26 may of course be easily removed from the side supports 20. All that is necessary is to move the frame forwardly to the position shown in broken lines in FIGURE 5 and then lift the front of the frame upwardly in a rocking movement about the rear stops 35 until the stops 32 clear the fronts 36 of the wire supports 20. The frame is then easily withdrawn forwardly from within the space 16.

When the frame is again installed within the cooking space 16 the above procedure is merely reversed. Then, with the frame in the forward supported position, as shown by the FIGURE 5 broken lines, the spit 38 is again loaded with food to be cooked and placed on the frame in the position shown in the FIGURE 5 broken lines. In this position the lever 40 is in the position illustrated at 51 with the forward end of the lever engaging the end depression 43. The frame with the spit and food thereon is then pushed rearwardly as far as it will go until the rear stops 35 engage the rear vertical wires 34. At this time the lever 41 is then moved into engagement with the depression 42 and this reinserts the driving end 50 of the spit 38 into the driving socket 49 whereupon the motor and gear unit 48 may be again engaged to rotate the spit so that the food 39 will be cooked as by the broiling unit illustrated at 17.

The apparatus of this invention is therefore easily installed in and removed from a cooking space and provides means by which the cooked food may be drawn forwardly of the cooking space for easy access with greatly lessened danger of the cook burning hear hands or arms while removing the food. Thus, it is not necessary that she reach into the heated cooking space to remove the food or the rotisserie itself, as both are easily withdrawn into readily accessible positions.

Having described my invention as related to the embodiment shown in the accompanying drawings, it is my intention that the invention be not limited by any of the details of description, unless otherwise specified, but rather be construed broadly within its spirit and scope as set out in the accompanying claims.

I claim:

1. Food supporting apparatus for cooking, comprising: means defining a chamber having an access opening for insertion and withdrawal of food relative to the chamber; a frame in said chamber; a rotatable food engaging member supported on said frame; driving means normally adjacent said frame for rotating said food engaging member, the food engaging member being movable relative to said frame into and out of engagement with said driving means; and movable means mounted on said frame for movement transversely to said opening and engaging said food engaging member for moving said food engaging member into and out of engagement with said driving means upon movement of said movable means, said movable means having an operating portion accessible at said opening.

2. Food supporting apparatus for cooking, comprising: means defining a chamber having an access opening for insertion and withdrawal of food relative to the chamber; a frame in said chamber; a rotatable food engaging member; movable means mounted on said frame for movement transversely to said opening and engaging said food engaging member and cooperating with the frame to support said food engaging member; and driving means normally adjacent said frame for rotating said food engaging member, said movable means being movable on said frame to move said food engaging member transversely to said opening into and out of engagement with said driving means, said movable means having an operating portion accessible at said opening.

3. Food supporting apparatus for cooking, comprising: a frame; a rotatable food engaging member; movable means mounted on said frame engaging said food engaging member and cooperating with the frame to support said food engaging member; driving means normally adjacent said frame for rotating said food engaging member, said movable means being movable on said frame to move said food engaging member into and out of engagement with said driving means; shoulder means on said frame engageable by said movable means for retaining said food engaging member in engagement with said driving means; and second shoulder means on said frame engagable by said movable means for retaining said food engaging member out of engagement with said driving means.

4. Food supporting apparatus for cooking, comprising: a frame having side members; a rotatable food engaging member; driving means normally adjacent said frame for rotating said food engaging member; means on said frame supporting one end of said food engaging member for rotational and generally axial movement; a lever on said frame supporting an opposite end of said food engaging member; means movably mounting said lever on a side member; and means uniting said food engaging member and lever for axial movement of said food engaging member into and out of engagement with said driving means upon movement of said lever.

5. In a cooking unit having means defining a cooking space accessible through a front opening and including a pair of opposite side walls and a rear wall, food supporting apparatus, comprising: a frame having side members including a pair of said member normally adjacent said side walls; means at said side walls for supporting said side members and thus said frame for movement between a rear position within said space and a projecting forward position; a rotatable food engaging member; driving means adjacent one of said side walls for rotating said food engaging member; means on said frame supporting one end of said food engaging member for rotational movement; a lever on said frame supporting an opposite end of said food engaging member; means movably mounting said lever on a side member; and means uniting said food engaging member and lever for axial movement of said food engaging member into and out of engagement with said driving means upon movement of said lever.

6. In a cooking unit having means defining a cooking space accessible through an access opening and including a pair of opposite side walls and a rear wall, food supporting apparatus, comprising; a frame having side members adjacent said side walls, said rear wall and said access opening; means at said side walls for supporting said side members and thus said frame for movement between a rear position within said space and a projecting forward position; a rotatable food engaging member; driving means at one of said side walls for rotating said food engaging member; means forming a part of said side member that is adjacent said one wall for rotatably supporting one end of said food engaging member; a lever oscillatably mounted on the side member that is adjacent said rear wall and engaging the side member that is adjacent said access opening supporting the opposite end of said food engaging member; and means uniting said food engaging member and lever for axial movement of said food engaging member into and out of engagement with said driving means upon movement of said lever.

7. The supporting apparatus of claim 6 wherein means are provided on said side member that is adjacent said access opening for selectively releasably retaining said lever in one position wherein said food engaging member is in engagement with said driving means and in a second position wherein said member is out of said engagement and inwardly of said one side wall.

8. The apparatus of claim 7 wherein said frame includes means engaging said side wall supporting means for limiting the extent of said forward projecting position.

References Cited in the file of this patent

UNITED STATES PATENTS

| | | |
|---|---|---|
| 2,729,160 | Pirz | Jan. 3, 1956 |
| 2,821,905 | Culligan | Feb. 4, 1958 |
| 2,847,932 | More | Aug. 19, 1958 |
| 2,927,479 | Pritz | Mar. 8, 1960 |
| 2,985,096 | Wolske | May 23, 1961 |